US012431087B2

(12) United States Patent
Jeong et al.

(10) Patent No.: US 12,431,087 B2
(45) Date of Patent: Sep. 30, 2025

(54) PIXEL CIRCUIT AND DISPLAY APPARATUS HAVING THE SAME

(71) Applicant: Samsung Display Co., LTD., Yongin-si (KR)

(72) Inventors: Keuk-Jin Jeong, Yongin-si (KR); Wongyun Kim, Yongin-si (KR); Min Kang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/887,434

(22) Filed: Sep. 17, 2024

(65) Prior Publication Data

US 2025/0104631 A1 Mar. 27, 2025

(30) Foreign Application Priority Data

Sep. 25, 2023 (KR) ........................ 10-2023-0127679

(51) Int. Cl.
*G09G 3/3233* (2016.01)

(52) U.S. Cl.
CPC ... *G09G 3/3233* (2013.01); *G09G 2300/0842* (2013.01); *G09G 2300/0861* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 9,355,593 B2 * | 5/2016 | Jeong | .................. | G09G 3/3233 |
| 2006/0208973 A1 * | 9/2006 | Lee | ...................... | G09G 3/3233 345/76 |
| 2016/0078818 A1 * | 3/2016 | Kang | .................. | G09G 3/3291 323/280 |
| 2016/0322450 A1 * | 11/2016 | Lee | ........................ | H10K 10/88 |
| 2020/0051472 A1 * | 2/2020 | Ju | .......................... | H10K 71/70 |
| 2024/0212584 A1 * | 6/2024 | Kim | ..................... | G09G 3/3233 |

FOREIGN PATENT DOCUMENTS

| | | |
|---|---|---|
| CN | 112669775 A | 4/2021 |
| JP | 2021128194 A | 9/2021 |

OTHER PUBLICATIONS

Kei Kimura, et al., "New pixel driving circuit using self-discharging compensation method for highresolution OLED micro displays on a silicon backplane", Journal of the SID 25/3, 2017, (10 pages).

* cited by examiner

*Primary Examiner* — Dorothy Harris
(74) *Attorney, Agent, or Firm* — CANTOR COLBURN LLP

(57) ABSTRACT

A pixel circuit includes a light-emitting element, a first transistor which applies a first power supply voltage to a second node in response to a voltage of a first node, a second transistor which applies a voltage of the second node to the first node in response to a control signal, a third transistor which applies the voltage of the second node to the light-emitting element in response to the control signal and a first capacitor connected to the first node. The first power supply voltage has a first voltage level, a second voltage level lower than the first voltage level or a data voltage.

20 Claims, 13 Drawing Sheets

PIXEL CIRCUIT AND DISPLAY APPARATUS HAVING THE SAME

This application claims priority to Korean Patent Application No. 10-2023-0127679, filed on Sep. 25, 2023, and all the benefits accruing therefrom under 35 U.S.C. § 119, the content of which in its entirety is herein incorporated by reference.

BACKGROUND

1. Field

Embodiments of the inventive concept relate to a display apparatus. More particularly, embodiments of the inventive concept relate to a pixel and a display apparatus including the pixel circuit.

2. Description of the Related Art

In general, a display apparatus may include a display panel and a display panel driver. The display panel may include a plurality of gate lines, a plurality of data lines, a plurality of emission lines, and a plurality of pixels. The display panel driver may include a gate driver which provides gate signals to the gate lines, a data driver which provides data voltages to the data lines, an emission driver which provides emission signals to the emission lines, and a driving controller which controls the gate driver, the data driver, and the emission driver.

Recently, a display apparatus which provide virtual reality ("VR") or augmented reality ("AR") are gaining prominence. For this purpose, a display apparatus is desired to have a low area and high integration. In this case, since a pitch occupied by the pixel circuit is narrowed, the number of transistors of the pixel circuit and the number of signals applied to the pixel circuit may have restriction.

SUMMARY

Embodiments of the inventive concept provide a pixel circuit having a relatively low area and relatively high integration and reduced a leakage current.

Embodiments of the inventive concept also provide a display apparatus including the pixel circuit.

In an embodiment of the disclosure, a pixel circuit includes a light-emitting element, a first transistor which applies a first power supply voltage to a second node in response to a voltage of a first node, a second transistor which applies a voltage of the second node to the first node in response to a control signal, a third transistor which applies the voltage of the second node to the light-emitting element in response to the control signal and a first capacitor connected to the first node. The first power supply voltage has a first voltage level, a second voltage level lower than the first voltage level or a data voltage.

In an embodiment, the second transistor is an N-type transistor, and the third transistor may be a P-type transistor.

In an embodiment, in a first period, the first power supply voltage may have the data voltage, the second transistor may be turned on in response to a logic high level of the control signal, and the third transistor may be turned off in response to the logic high level of the control signal.

In an embodiment, in a second period following the first period, the first power supply voltage may have the first voltage level, the second transistor may be turned off in response to a logic low level of the control signal, and the third transistor may be turned on in response to the logic low level of the control signal.

In an embodiment, the pixel circuit may further include a fourth transistor which applies the first power supply voltage to the first transistor in response to an emission signal.

In an embodiment, in a first period, the first power supply voltage may have the second voltage level, the emission signal may have an inactivation level, the second transistor may be turned on in response to a logic high level of the control signal, and the third transistor may be turned off in response to the logic high level of the control signal.

In an embodiment, in a second period following the first period, the first power supply voltage may have the data voltage, the emission signal may have an activation level, and the fourth transistor may be turned on in response to the activation level of the emission signal.

In an embodiment, in a third period following the second period, the first power supply voltage may have the second voltage level, the emission signal may have the inactivation level, and the fourth transistor may be turned off in response to the inactivation level of the emission signal.

In an embodiment, in a fourth period following the third period, the first power supply voltage may have the first voltage level, the emission signal may have an activation level, the fourth transistor may be turned on in response to the activation level of the emission signal, the second transistor may be turned off in response to a logic low level of the control signal, and the third transistor may be turned on in response to the logic low level of the control signal.

In an embodiment, the pixel circuit may further include a fourth transistor which applies the first power supply voltage to the first transistor in response to an emission signal. The second transistor may be P-type transistor, and the third transistor may be an N-type transistor.

In an embodiment, in a first period, the first power supply voltage may have the second voltage level, the emission signal may have an inactivation level, the second transistor may be turned on in response to a logic low level of the control signal, and the third transistor may be turned off in response to the logic low level of the control signal.

In an embodiment, in a second period following the first period, the first power supply voltage may have the data voltage, the emission signal may have an activation level, and the fourth transistor may be turned on in response to the activation level of the emission signal.

In an embodiment, in a third period following the second period, the first power supply voltage may have the second voltage level, the emission signal may have the inactivation level, and the fourth transistor may be turned off in response to the inactivation level of the emission signal.

In an embodiment, in a fourth period following the third period, the first power supply voltage may have the first voltage level, the emission signal may have an activation level, the fourth transistor may be turned on in response to an activation level of the emission signal, the second transistor may be turned off in response to a logic high level of the control signal, and the third transistor may be turned on in response to the logic high level of the control signal.

In an embodiment of the disclosure, a pixel circuit includes a first transistor including a control electrode connected to a first node, a first electrode connected to a second node and a second electrode connected to a third node, a second transistor including a control electrode which receives an emission signal, a first electrode which receives a first power supply voltage and a second electrode connected to the second node, a third transistor including a control electrode which receives a control signal, a first electrode connected to the third node and a second electrode connected to the first node, a fourth transistor including a control electrode which receives the control signal, a first electrode connected to the third node and a second electrode connected to a fourth node, a first capacitor including a first electrode which receives a second power supply voltage and a second electrode connected to the first node and a light-emitting element including an anode connected to the fourth node and a cathode which receives a third power supply voltage. The first power supply voltage may have a first voltage level, a second voltage level lower than the first voltage level or a data voltage.

In an embodiment, the third transistor is an N-type transistor, and the fourth transistor is a P-type transistor.

In an embodiment, the third transistor is a P-type transistor, and the fourth transistor is an N-type transistor.

In an embodiment of the disclosure, a display apparatus includes a display panel including a pixel circuit, a data driver which applies a first power supply voltage to the pixel circuit, a gate driver which applies a control signal to the pixel circuit, an emission driver which applies an emission signal to the pixel circuit and a driving controller which controls the data driver, the gate driver and the emission driver. The pixel circuit includes a light-emitting element, a first transistor which applies the first power supply voltage to a second node in response to a voltage of a first node, a second transistor which applies the first power supply voltage to the first transistor in response to the emission signal, a third transistor which applies a voltage of the second node to the first node in response to the control signal, a fourth transistor which applies the voltage of the second node to the light-emitting element in response to the control signal and a first capacitor connected to the first node. The first power supply voltage may have a first voltage level, a second voltage level lower than the first voltage level or a data voltage.

In an embodiment, the third transistor may be an N-type transistor, and the fourth transistor may be a P-type transistor.

In an embodiment, the pixel circuit may be formed on a silicon-based substrate.

As described above, a pixel circuit in embodiments may have a smaller number of transistors and a smaller number of capacitors compared to a conventional pixel. Accordingly, an integration of the pixel circuit may be improved and a power consumption may be reduced. Additionally, one of transistors which the pixel circuit includes may be an N-type transistor. Accordingly, a leakage current of the pixel circuit may be reduced, thereby improving reliability and stability.

BRIEF DESCRIPTION OF THE DRAWINGS

The above and other features and advantages of the inventive concept will become more apparent by describing in detailed embodiments thereof with reference to the accompanying drawings, in which.

DETAILED DESCRIPTION

Figure 1:
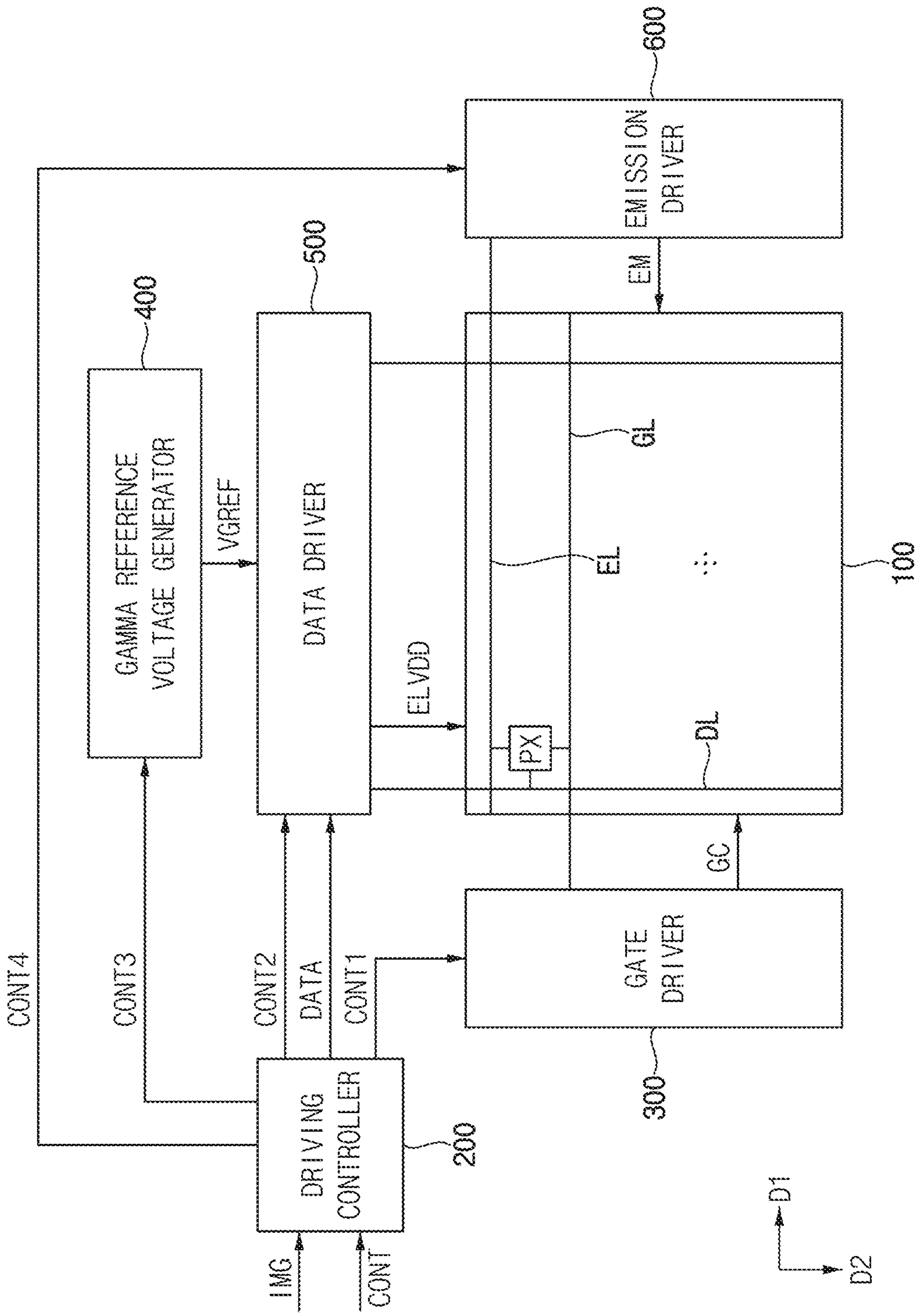
FIG. 1 is a block diagram illustrating an embodiment of a display apparatus.

Hereinafter, the inventive concept will be described in more detail with reference to the accompanying drawings.

It will be understood that when an element is referred to as being "on" another element, it can be directly on another element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram illustrating an embodiment of a display apparatus.

Referring to FIG. 1, the display apparatus may include a display panel 100 and a display panel driver. The display panel driver may include a driving controller 200, a gate driver 300, a gamma reference voltage generator 400, a data driver 500, and an emission driver 600.

The display panel 100 may include a display part which displays an image, and a peripheral part that is adjacent to the display part.

The display panel 100 may include a gate line GL, a data line DL, an emission line EL and a pixel circuit PX electrically connected to the gate line GL, the data line DL, the emission line EL respectively. The gate line GL may extend in a first direction D1, the data line DL may extend in a second direction D2 crossing the first direction D1, and the emission lines EL may extend in the first direction D1.

The driving controller 200 may receive an input image data IMG and an input control signal CONT from an external device. In an embodiment, the input image data IMG may include red image data, green image data, and blue image data, for example. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a gate control signal CONT1, a data control signal CONT2, a gamma control signal CONT3, an emission control signal CONT4 and a data signal DATA based on the input image data IMG and the input control signal CONT.

The driving controller 200 may generate the gate control signal CONT1 for controlling an operation of the gate driver 300 based on the input control signal CONT to output the generated gate control signal CONT1 to the gate driver 300. The gate control signal CONT1 may include a vertical start signal and a gate clock signal.

The driving controller 200 may generate the data control signal CONT2 for controlling an operation of the data driver 500 based on the input control signal CONT to output the generated data control signal CONT2 to the data driver 500. The data control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the gamma control signal CONT3 for controlling an operation of the gamma reference voltage generator 400 based on the input control signal CONT to output the generated gamma control signal CONT3 to the gamma reference voltage generator 400.

The driving controller 200 may generate the emission control signal CONT4 for controlling an operation of the emission driver 600 based on the input control signal CONT to output the generated emission control signal CONT4 to the emission driver 600.

The gate driver 300 may generate a control signal GC for driving the gate line GL in response to the gate control signal CONT1 received from the driving controller 200. The gate driver 300 may output the control signal GC to the gate line GL.

In an embodiment, the gate driver 300 may be disposed (e.g., mounted) on the peripheral region of the display panel, for example. In an embodiment, the gate driver 300 may be integrated on the peripheral region of the display panel, for example.

The gamma reference voltage generator 400 may generate a gamma reference voltage VGREF in response to the gamma control signal CONT3 received from the driving controller 200. The gamma reference voltage generator 400 may provide the gamma reference voltage VGREF to the data driver 500.

In an embodiment, the gamma reference voltage generator 400 may be disposed in the driving controller 200, or in the data driver 500.

The data driver 500 may receive the data control signal CONT2 and the data signal DATA from the driving controller 200, and receive the gamma reference voltage VGREF from the gamma reference voltage generator 400. The data driver 500 may convert the data signal DATA into an analog data voltage VDATA by the gamma reference voltage VGREF. The data driver 500 may output a first power supply voltage ELVDD to the data line DL. In the illustrated embodiment, the first power supply voltage ELVDD may have the data voltage VDATA. Additionally, in the illustrated embodiment, the first power supply voltage ELVDD may have a first voltage level VGH of FIG. 3 and a second voltage level VGL of FIG. 3 lower than the first voltage level VGH of FIG. 3. In an embodiment, an operation which the data voltage is applied to the pixel circuit PX may referred to as a data writing operation, for example.

In an embodiment, the data driver 500 may be disposed (e.g., mounted) on the peripheral region of the display panel, for example. In an embodiment, the data driver 500 may be integrated on the peripheral region of the display panel, for example.

The emission driver 600 may generate emission signal EM for driving the emission line EL in response to the emission control signal CONT4 received from the driving controller 200. The emission driver 600 may output the emission signal EM to the emission lines EL.

In an embodiment, the emission driver 600 may be integrated on the peripheral region of the display panel 100, for example. In an embodiment, the emission driver 600 may be disposed (e.g., mounted) on the peripheral region of the display panel 100, for example.

Although it has been illustrated in FIG. 1 that the gate driver 300 is disposed on a first side (e.g., left side in FIG. 1) of the display panel 100, and the emission driver 600 is disposed on a second side (e.g., right side in FIG. 1) of the display panel 100, which is opposite to the first side, the inventive concept is not limited thereto. The gate driver 300 and the emission driver 600 may be disposed on the same side of the display panel 100. In an embodiment, the gate driver 300 and the emission driver 600 may be integrated on the peripheral region of the display panel 100 on the same side of the display region of the display panel 100, for example. In an embodiment, the gate driver 300 and the emission driver 600 may be formed integrally with each other, for example.

Figure 2:
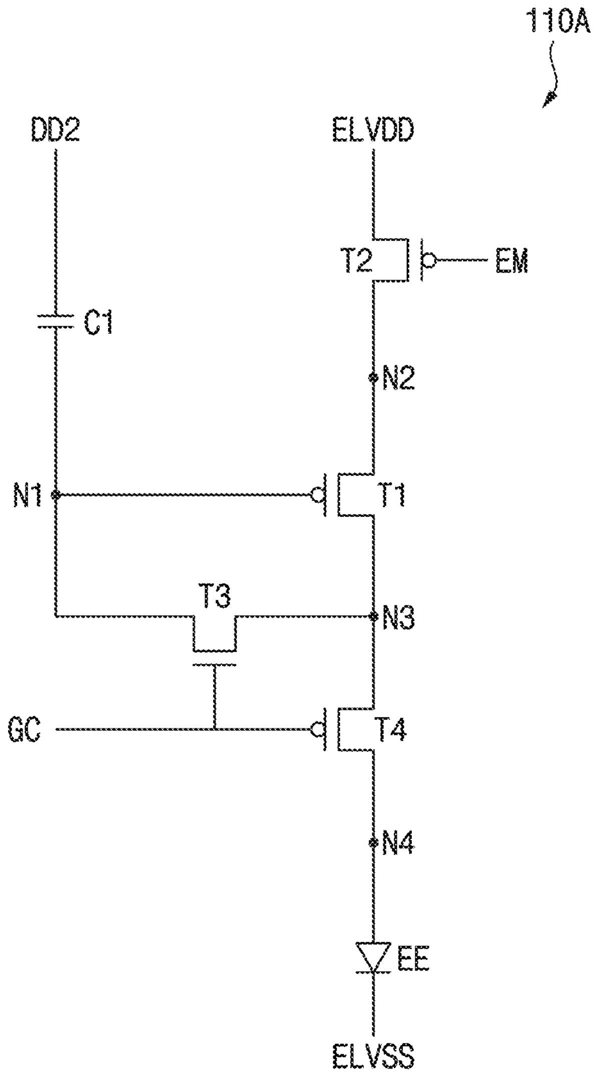
FIG. 2 is a circuit diagram illustrating an embodiment of a pixel circuit.

FIG. 2 is a circuit diagram illustrating an embodiment of a pixel circuit.

Referring to FIG. 2, the pixel circuit 110A may include a first transistor T1, a second transistor T2, a third transistor T3, a fourth transistor T4, a first capacitor C1 and a light-emitting element EE. The pixel circuit 110A may include four transistors and one capacitor. That is, the pixel circuit 110A may have a 4T1C structure.

The first transistor T1 may include a control electrode connected to a first node N1, a first electrode connected to a second node N2 and a second electrode connected to third node N3. The first transistor T1 may apply a voltage of the second node N2 to the third node N3 in response to a voltage of the first node N1. Additionally, the first transistor T1 may generate a driving current for driving the light-emitting element EE in response to the voltage of the first node N1.

The second transistor T2 may include a control electrode which receives the emission signal EM, a first electrode which receives the first power supply voltage ELVDD and a second electrode connected to the second node N2. The second transistor T2 may apply the first power supply voltage ELVDD to the second node N2 in response to the emission signal EM.

Figure 3:
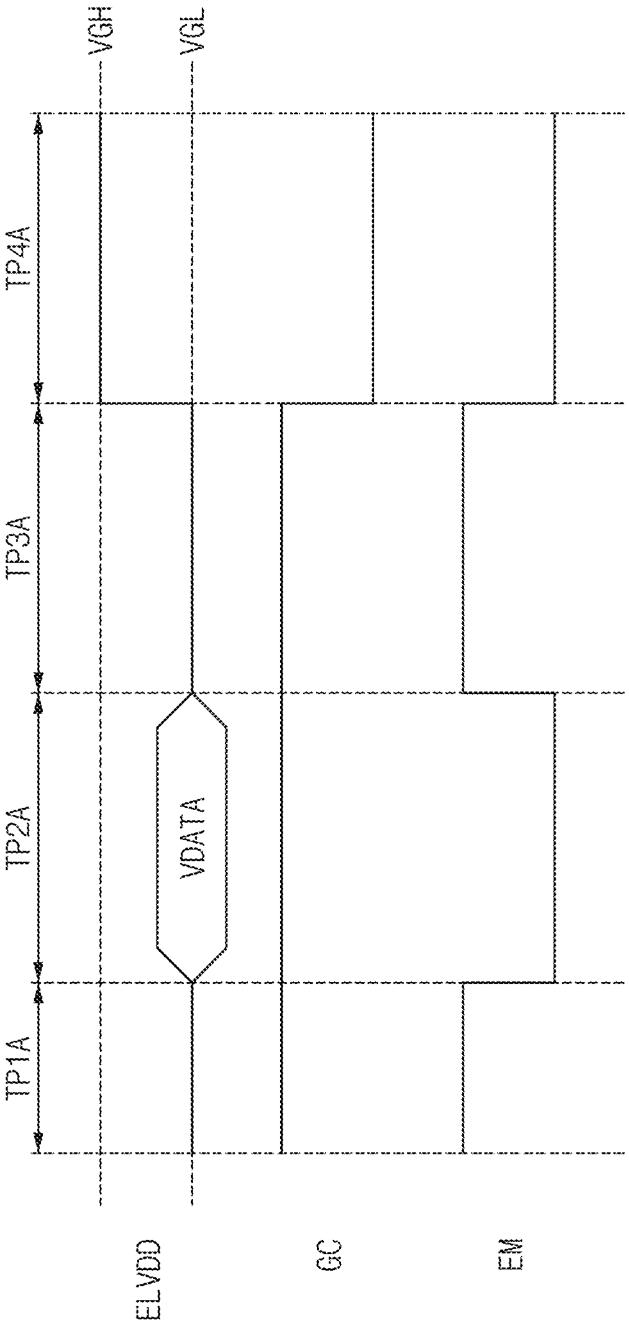
FIG. 3 is a timing diagram illustrating an embodiment of input signals applied to the pixel circuit of FIG. 2.

In an embodiment, the first power supply voltage ELVDD in the illustrated embodiment may have the first voltage level VGH of FIG. 3, the second voltage level VGL of FIG. 3 and the data voltage VDATA, for example. Accordingly, when the pixel circuit 110A is disposed in multiple rows, a different data voltage VDATA may be applied to each row through the second transistor T2 which responds to the emission signal EM.

The third transistor T3 may include a control electrode which receives the control signal GC, a first electrode connected to the third node N3 and a second electrode connected to the first node N1. The third transistor T3 may apply a voltage of the third node N3 to the first node N1 in response to the control signal GC.

The fourth transistor T4 may include a control electrode which receives the control signal GC, a first electrode connected to the third node N3 and a second electrode connected to a fourth node N4. The fourth transistor T4 may apply the driving current to the light-emitting element EE in response to the control signal GC.

One of the third transistor T3 and the fourth transistor T4 may be an N-type transistor, and another may be a P-type transistor. In the illustrated embodiment, the third transistor T3 may be an N-type transistor and the fourth transistor may be a P-type transistor. Additionally, the first transistor T1 and the second transistor T2 may be a P-type transistor.

The fourth transistor T4 may be a polysilicon thin film transistor. In an embodiment, the first transistor T1, the second transistor T2, and the fourth transistor T4 may be low temperature polysilicon ("LTPS") thin film transistors, for example. In an embodiment, the third transistor T3 may be an oxide thin film transistor, for example.

A conventional pixel circuit receives a plurality of gate signals. In contrast, the pixel circuit 110A may operate in response to one gate signal (e.g., the control signal GC). Accordingly, unlike the conventional pixel circuit, the pixel circuit 110A may operate with a relatively small number of signals, so the integration of the pixel circuit 110A may be improved. Additionally, an absolute value of a threshold voltage of an N-type transistor is lower than an absolute value of a threshold voltage of a P-type transistor, so a leakage current may be reduced. One of the third transistor T3 and the fourth transistor T4 which the pixel circuit 110A includes may be an N-type transistor. Accordingly, a leakage current flowing through the pixel circuit 110A may be reduced. Accordingly, reliability and stability of pixel circuit 110A may be improved.

The first capacitor C1 may include a first electrode which receives a second power supply voltage DD2 and a second electrode connected to the first node N1. The first capacitor C1 may store the voltage of the first node N1.

The light-emitting element EE may include an anode connected to the fourth node N4 and a cathode which receives a third power supply voltage ELVSS. The third power supply voltage ELVSS may be lower than the first voltage level VGH. In an embodiment, the light-emitting element EE may be an organic light-emitting diode. However, the inventive concept is not limited thereto. In other embodiment, the light-emitting element EE may be a nano light-emitting diode, quantum dot light-emitting diode, micro light-emitting diode, and in organic light-emitting diode, or any other suitable light-emitting element.

In an embodiment, the pixel circuit 110A may be formed on a silicon-based substrate. Accordingly, the first voltage level VGH and the second voltage level VGL of the first power supply voltage ELVDD may set stably. Additionally, since the pixel circuit 110A may be formed on a silicon-based substrate, one of the third transistor T3 and the fourth transistor T4 may be formed as an N-type transistor stably.

Figure 4:
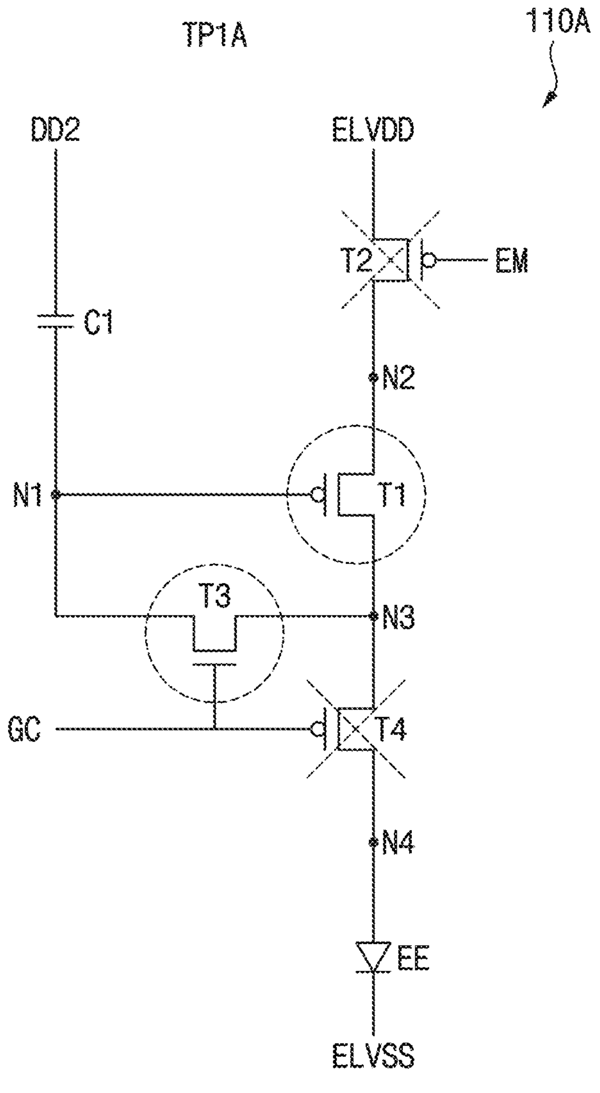
FIG. 4 is a circuit diagram illustrating an operation of the pixel circuit of FIG. 2 in a first period of FIG. 3.
Figure 5:
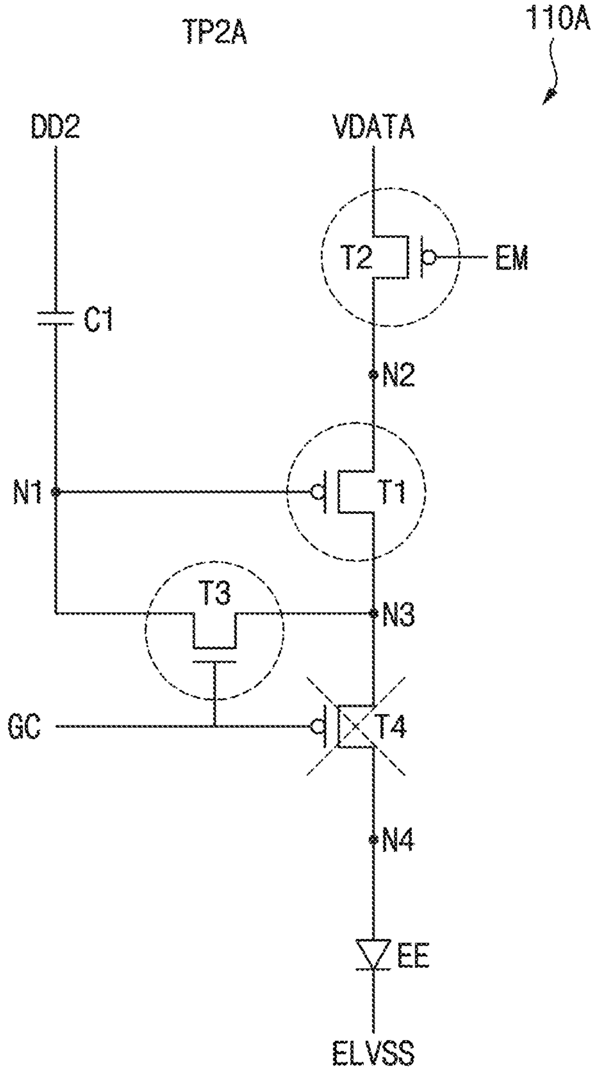
FIG. 5 is a circuit diagram illustrating an operation of the pixel circuit of FIG. 2 in a second period of FIG. 3.
Figure 6:
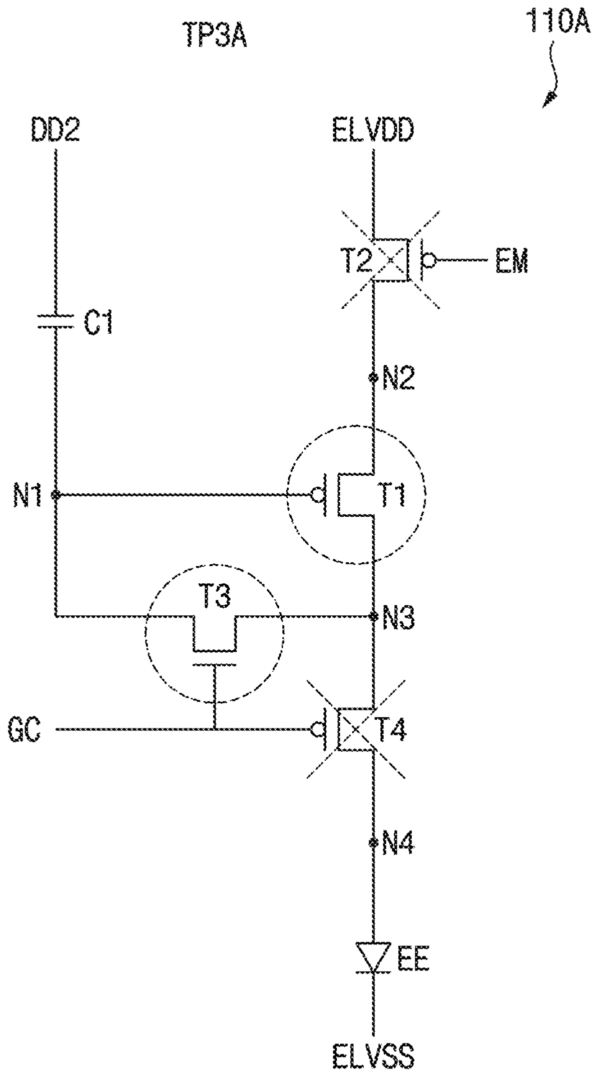
FIG. 6 is a circuit diagram illustrating an operation of the pixel circuit of FIG. 2 in a third period of FIG. 3.
Figure 7:
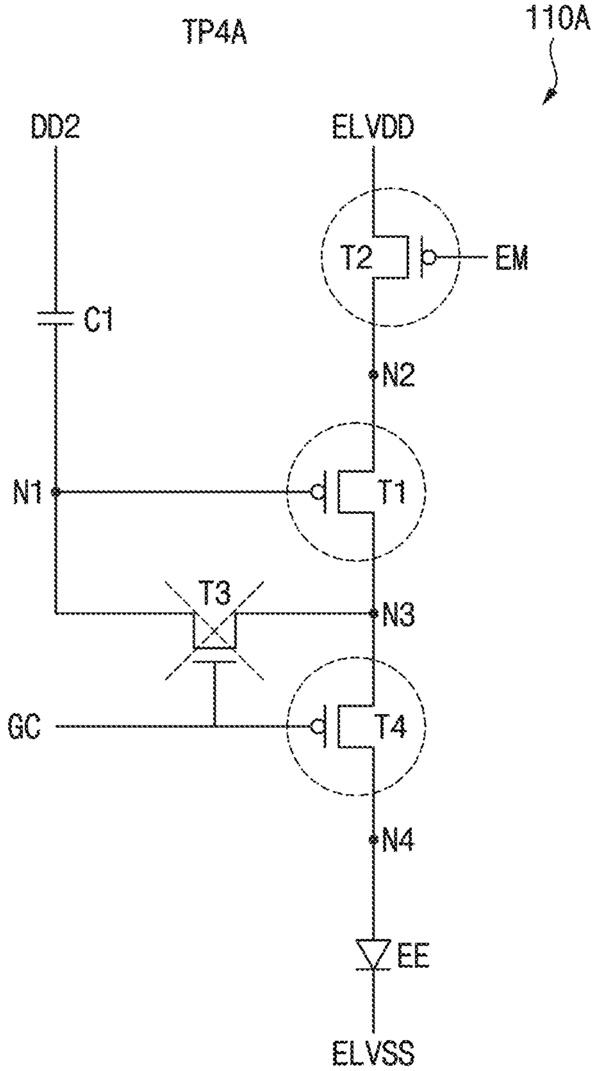
FIG. 7 is a circuit diagram illustrating an operation of the pixel circuit of FIG. 2 in a fourth period of FIG. 3.

FIG. 3 is a timing diagram illustrating an embodiment of input signals applied to the pixel circuit 110A of FIG. 2. FIG. 4 is a circuit diagram illustrating an operation of the pixel circuit 110A of FIG. 2 in a first period TP1A of FIG. 3. FIG. 5 is a circuit diagram illustrating an operation of the pixel circuit 110A of FIG. 2 in a second period TP2A of FIG. 3. FIG. 6 is a circuit diagram illustrating an operation of the pixel circuit 110A of FIG. 2 in a third period TP3A of FIG. 3. FIG. 7 is a circuit diagram illustrating an operation of the pixel circuit 110A of FIG. 2 in a fourth period TP4A of FIG. 3.

Referring to FIG. 3, for example, the first power supply voltage ELVDD in the illustrated embodiment may have the first voltage level VGH, the second voltage level VGL and the data voltage VDATA. Accordingly, when the pixel circuit 110A is arranged in multiple rows, a different data voltage VDATA may be applied to each row through the second transistor T2 which responds to the emission signal EM.

Referring to FIG. 3 and FIG. 4, in a first period TP1A, the first power supply voltage ELVDD may have the second voltage level VGL, the control signal GC may have a logic high level, and the emission signal EM may have an inactivation level. In an embodiment, the logic high level is a voltage level at which an N-type transistor is turned on, and a P-type transistor is turned off, for example. In an embodiment, a logic low level is a voltage level at which an N-type transistor is turned off, and a P-type transistor is turned on, for example.

In the first period TP1A, the first transistor T1 may maintain a turn-on state. The second transistor T2 may be turned off in response to an inactivation level of the emission signal EM. The third transistor T3 may be turned on in response to the logic high level of the control signal GC. The fourth transistor T4 may turned off in response to the logic high level of the control signal GC. The light-emitting element EE may not emit the light as the fourth transistor T4 may be turned off.

In an embodiment, when the pixel circuit 110A is arranged in multiple rows, the data writing operation may be performed for each row, for example. The second transistor T2 of a pixel circuit row in which the data writing operation is not performed may be turned off in response to an inactivation level of the emission signal EM in the first period TP1A. Accordingly, the data voltage VDATA may be prevented from being applied to the pixel circuit row in which the data writing operation is not performed. In an embodiment, the first period TP1A may be referred to as a first holding period, for example.

Referring to FIG. 3 and FIG. 5, in the second period TP2A, the first power supply voltage ELVDD may have the data voltage VDATA, the control signal GC may have the logic high level, and the emission signal EM may have an activation level.

In the second period TP2A, the first transistor T1 may maintain a turn-on state. The second transistor T2 may be turned on in response to an activation level of the emission signal EM. The third transistor T3 may maintain a turn on state in response to the logic high level of the control signal GC. The fourth transistor T4 may maintain a turn off state in response to the logic high level of the control signal GC. Since the first transistor T1, the second transistor T2 and the third transistor T3 may be turned on, the data voltage VDATA may be applied to the first node N1.

Additionally, in the second period TP2A, the third transistor T3 may diode-connect the first transistor T1 in response to the logic high level of the control signal GC. Accordingly, the voltage of the first node N1 may be a sum of the data voltage VDATA and a threshold voltage of the first transistor T1 through a diode-connection of the first transistor T1. Additionally, since the first electrode of the first capacitor C1 may be applied with the second power supply voltage DD2, and a voltage of the second electrode of the first capacitor C1 may be the voltage of the first node N1 which is the sum of the threshold voltage of the first transistor T1 and the data voltage VDATA, a voltage considering the threshold voltage of the first transistor T1 and the data voltage VDATA may be stored between the first and the second electrodes of the first capacitor C1.

Referring to FIG. 3 and FIG. 6, in the third period TP3A, the first power supply voltage ELVDD may have the second voltage level VGL, the control signal GC may have the logic high level, and the emission signal EM may have an inactivation level.

In the third period TP3A, the second transistor T2 may be turned off in response to an inactivation level of the emission signal EM. The fourth transistor T4 may be turned off in response to the logic high level of the control signal GC. Since the fourth transistor T4 may be turned off, the light-emitting element EE may not emit the light.

In an embodiment, when the pixel circuit 110A is arranged in multiple rows, the data writing operation may be performed for each row, for example. The second transistor T2 of a pixel circuit row in which the data writing operation is not performed may be turned off in response to an inactivation level of the emission signal EM in the third period TP3A. Accordingly, the data voltage VDATA may be prevented from being applied to the pixel circuit row in which the data writing operation is not performed. Accordingly, the voltage of the first node N1 in the third period TP3A may maintain at the voltage of the first node N1 in the second period TP2A. In an embodiment, the third period TP3A may be referred to as a second holding period, for example.

Referring to FIG. 3 and FIG. 7, in the fourth period TP4A, the first power supply voltage ELVDD may have the first voltage level VGH, the control signal GC may have the logic low level, and the emission signal EM may have an activation level.

In the fourth period TP4A, the first transistor T1 may generate the driving current based on the voltage of the first node N1 in the third period TP3A. The second transistor T2 may apply the first power supply voltage ELVDD having the first voltage level VGH to the second node N2 in response to an activation level of the emission signal EM. The first transistor T1 may apply the first power supply voltage ELVDD applied to the second node N2 to the third node N3. The third transistor T3 may be turned off in response to the logic low level of the control signal GC. The fourth transistor T4 may be turned on in response to the logic low level of the control signal GC. Since the fourth transistor T4 may be turned on, the voltage of the third node N3 may be applied to the fourth node N4. Accordingly, the light-emitting element EE may emit the light based on a voltage of the fourth node N4 and the driving current.

The pixel circuit 110A may operate with a relatively small number of signals. Additionally, the number of transistors and the number of capacitors of the pixel circuit 110A may be reduced. Accordingly, the integration of the pixel circuit 110A may be improved and a power consumption may be reduced.

Figure 8:
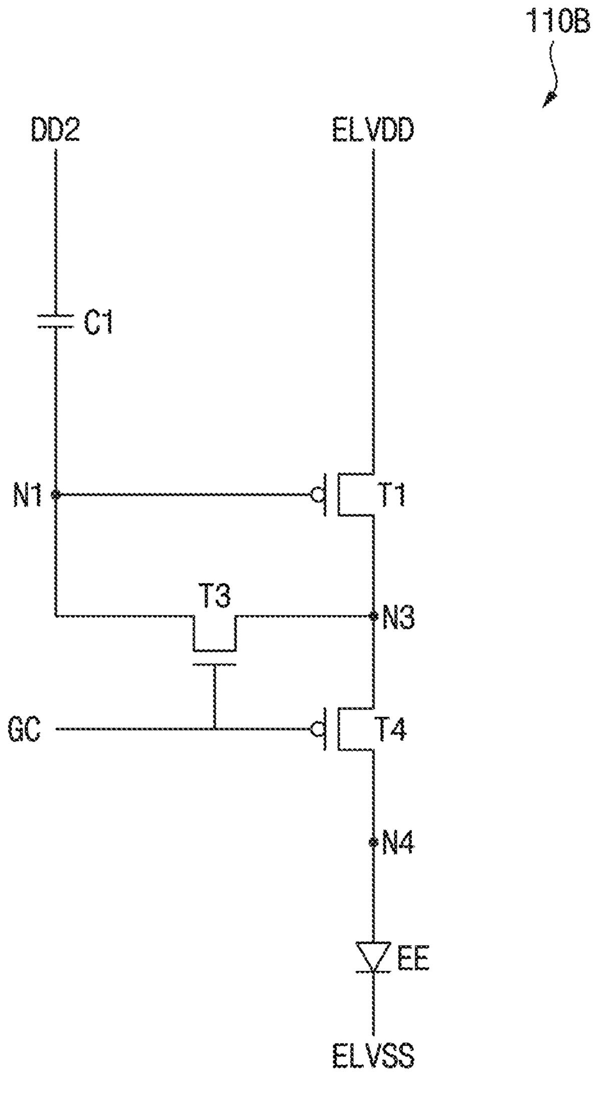
FIG. 8 is a circuit diagram illustrating an embodiment of a pixel circuit.

FIG. 8 is a circuit diagram illustrating an embodiment of a pixel circuit 110B.

Since a pixel circuit 110B in the illustrated embodiment is substantially identical to the pixel circuit 110A of FIG. 2, except that the first electrode of the first transistor T1 may be applied with the first power supply voltage ELVDD. Thus, the same reference numerals will be used to refer to the same and any repetitive explanation concerning the above elements will be omitted.

The pixel circuit 110B may include the first transistor T1, the third transistor T3, the fourth transistor T4, the first capacitor C1 and the light-emitting element EE. In an embodiment, the pixel circuit 110B may have a 3T1C structure including three transistors and one capacitor, for example. Accordingly, the integration of the pixel circuit 110B may be further improved compared to the conventional pixel circuit.

Figure 9:
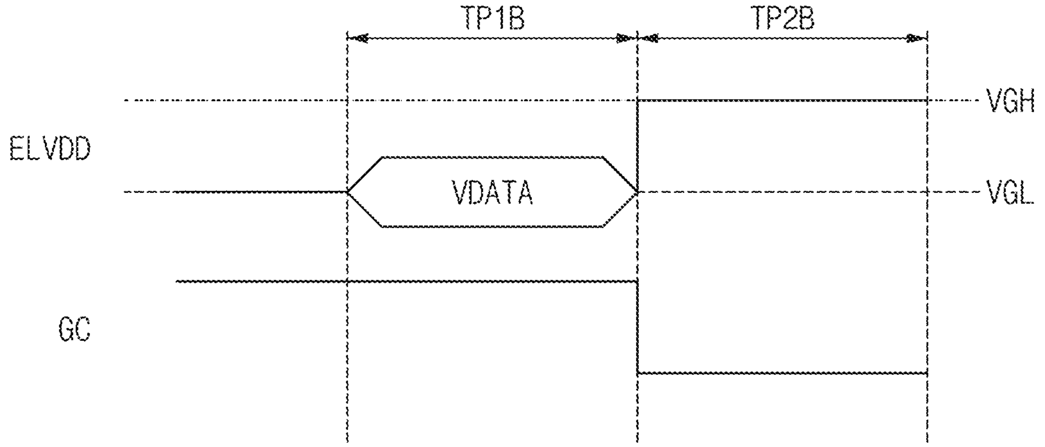
FIG. 9 is a timing diagram illustrating an embodiment of input signals applied to the pixel circuit of FIG. 8.

FIG. 9 is a timing diagram illustrating an embodiment of input signal applied to the pixel circuit 110B of FIG. 8.

Referring to FIG. 8 and FIG. 9, in a first period TP1B, the first power supply voltage ELVDD may have the data voltage VDATA, the control signal GC may have the logic high level.

In the first period TP1B, the first transistor T1 may maintain a turn on state. The third transistor T3 may have a turn on state in response to the logic high level of the control signal GC. The fourth transistor may maintain the turn off state in response to the logic high level of the control signal GC. Since the first transistor T1 and the third transistor T3 may be turned on, the data voltage VDATA may be apply to the first node N1.

Additionally, in the first period TP1A, the third transistor T3 may diode-connect the first transistor T1 in response to the logic high level of the control signal GC. Accordingly, the voltage of the first node N1 may be a sum of the data voltage VDATA and a threshold voltage of the first transistor T1 through a diode connection of the first transistor T1.

Additionally, since the first electrode of the first capacitor C1 may be applied with the second power supply voltage DD2, and a voltage of the second electrode of the first capacitor C1 may be the voltage of the first node N1 which is the sum of the threshold voltage of the first transistor T1 and the data voltage VDATA, a voltage considering the threshold voltage of the first transistor T1 and the data voltage VDATA may be stored between the first and the second electrodes of the first capacitor C1.

In a second period TP2B, the first power supply voltage ELVDD may have the first voltage level VGH, the control signal GC may have the logic low level.

In the second period TP2B, the fourth transistor T4 may be turned on in response to the logic low level of the control signal GC. The first transistor T1 may generate the driving current based on the voltage of the first node N1 in the first period TP1B. Accordingly, the light-emitting element EE may emit the light based on the driving current.

The pixel circuit 110B may operate with a relatively small number of signals. Additionally, the number of transistors and the number of capacitors of the pixel circuit 110B may be reduced. Accordingly, the integration of the pixel circuit 110B may be improved and a power consumption may be reduced. Additionally, an absolute value of a threshold voltage of an N-type transistor is lower than an absolute value of a threshold voltage of a P-type transistor, so a leakage current may be reduced. One of the third transistor T3 and the fourth transistor T4 which the pixel circuit 110B includes may be an N-type transistor. Accordingly, a leakage current flowing through the pixel circuit 110B may be reduced. Accordingly, reliability and stability of pixel circuit 110B may be improved.

Figure 10:
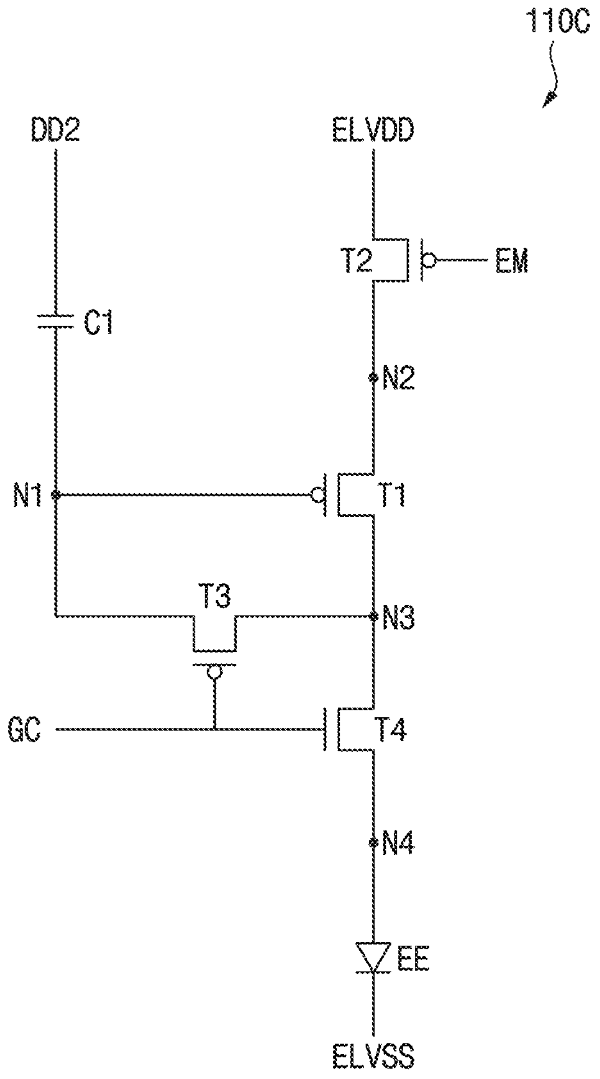
FIG. 10 is a circuit diagram illustrating an embodiment of a pixel circuit.

FIG. 10 is a circuit diagram illustrating an embodiment of a pixel circuit 110C.

Since a pixel circuit 110C in the illustrated embodiment is substantially identical to the pixel circuit 110A of FIG. 2, except that the third transistor T3 may be a P-type transistor and the fourth transistor T4 may be an N-type transistor. Thus, the same reference numerals will be used to refer to the same and any repetitive explanation concerning the above elements will be omitted.

Referring to FIG. 10, one of the third transistor T3 and the fourth transistor T4 may be an N-type transistor, and the other may be a P-type transistor. In the illustrated embodiment, the third transistor T3 may be a P-type transistor and the fourth transistor may be an N-type transistor. Additionally, the first transistor T1 and the second transistor T2 may be a P-type transistor.

Figure 11:
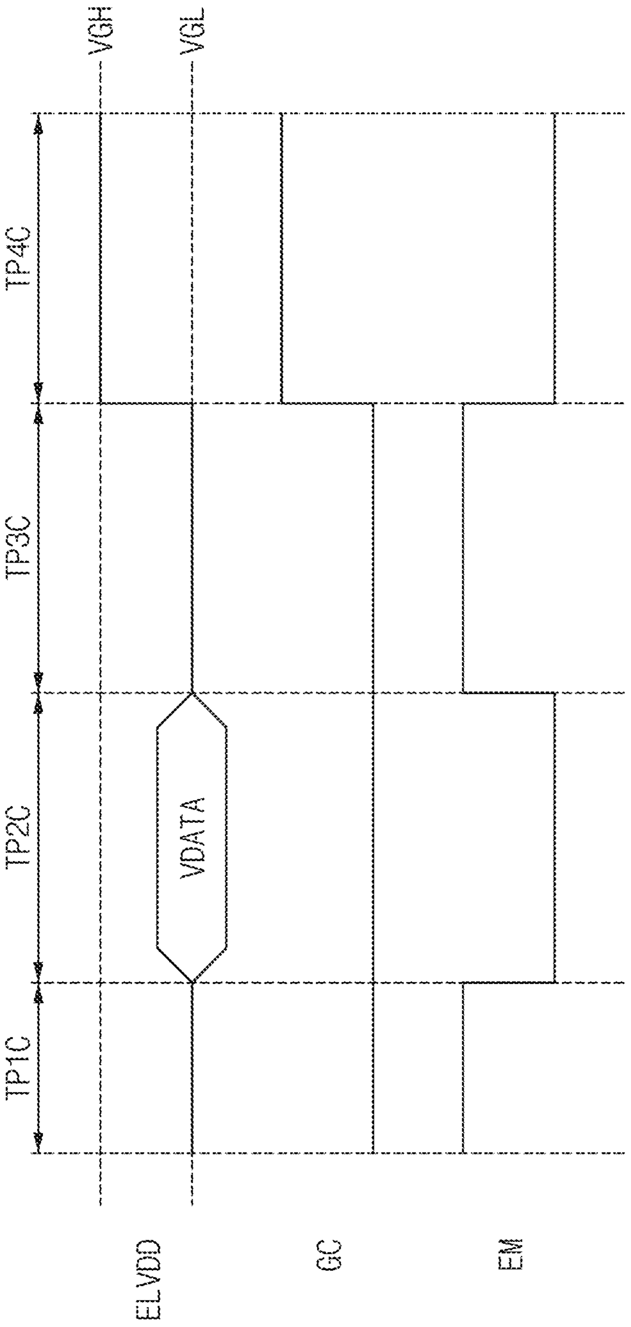
FIG. 11 is a timing diagram illustrating an embodiment of input signals applied to the pixel circuit of FIG. 10.

FIG. 11 is a timing diagram illustrating an embodiment of input signal applied to the pixel circuit 110C of FIG. 10.

The timing diagram of FIG. 11 may include a first period TP1C, a second period TP2C, a third period TP3C and a fourth period TP4C. Since the timing diagram of FIG. 11 is substantially identical to the timing diagram of FIG. 3, except that the control signal GC may have the logic low level in the first period TP1C, the second period TP2C and the third period TP3C, and the control signal GC may have the logic high level in the fourth period TP4C. Thus, the same reference numerals will be used to refer to the same and any repetitive explanation concerning the above elements will be omitted.

The pixel circuit 110C may operate with a relatively small number of signals. Additionally, the number of transistors and the number of capacitors of the pixel circuit 110C may be reduced. Accordingly, the integration of the pixel circuit 110C may be improved and a power consumption may be reduced. Additionally, an absolute value of a threshold voltage of an N-type transistor is lower than an absolute value of a threshold voltage of a P-type transistor, so a leakage current may be reduced. One of the third transistor T3 and the fourth transistor T4 which the pixel circuit 110C includes may be an N-type transistor. Accordingly, a leakage current flowing through the pixel circuit 110C may be reduced. Accordingly, reliability and stability of pixel circuit 110C may be improved.

Figure 12:
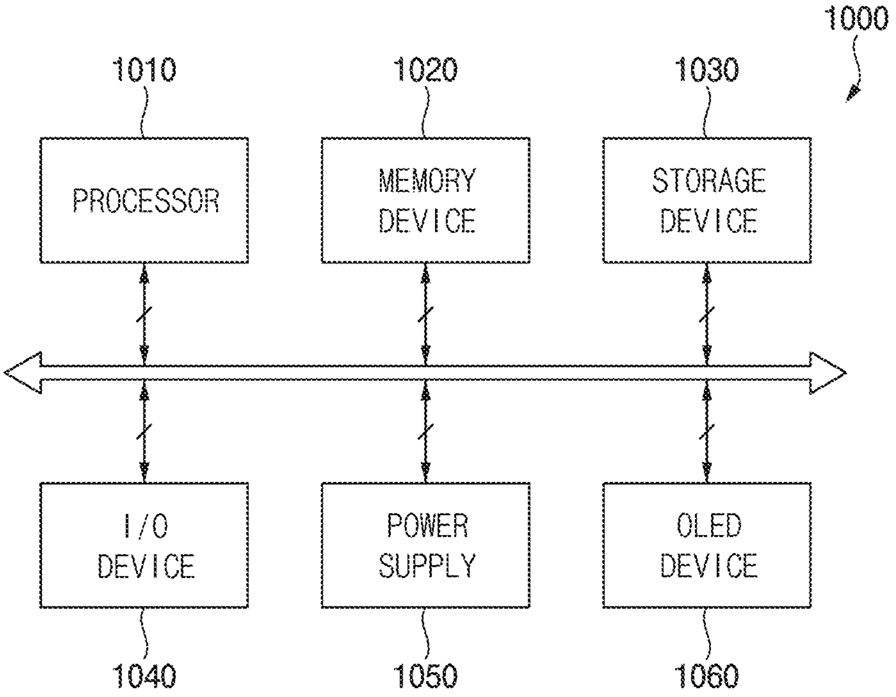
FIG. 12 is a block diagram illustrating an embodiment of an electronic device.
Figure 13:
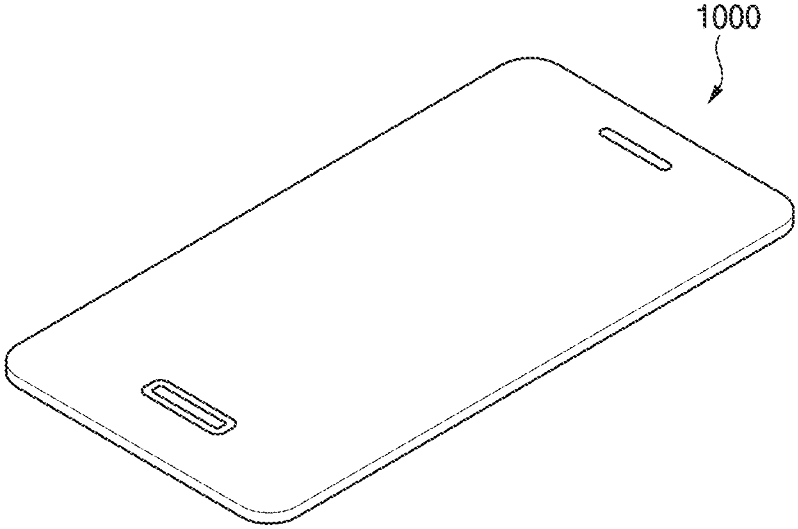
FIG. 13 is a diagram illustrating an embodiment in which the electronic device of FIG. 12 is implemented as a smart phone.

FIG. 12 is a block diagram illustrating an embodiment of an electronic device according to the inventive concept. FIG. 13 is a diagram illustrating an embodiment in which the electronic device of FIG. 9 is implemented as a smart phone.

Referring to FIGS. 12 and 13, the electronic apparatus 1000 may include a processor 1010, a memory device 1020, a storage device 1030, an input/output ("I/O") device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus ("USB") device, other electronic apparatuses, etc.

In an embodiment, as shown in FIG. 13, the electronic apparatus 1000 may be implemented as a smart phone. However, the electronic apparatus 1000 is not limited thereto. In an embodiment, the electronic apparatus 1000 may be implemented as a cellular phone, a video phone, a smart pad, a smart watch, a tablet personal computer ("PC"), a car navigation system, a computer monitor, a laptop, a head mounted display ("HMD") device, or the like, for example.

The processor 1010 may perform various computing functions or various tasks. The processor 1010 may be a micro-processor, a central processing unit ("CPU"), an application processor ("AP"), or the like. The processor 1010 may be coupled to other components via an address bus, a control bus, a data bus, etc. Further, the processor 1010 may be coupled to an extended bus such as a peripheral component interconnection ("PCI") bus.

The processor 1010 may output the input image data IMG and the input control signal CONT to the driving controller 200 of FIG. 1.

The memory device 1020 may store data for operations of the electronic apparatus 1000. In an embodiment, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, or the like and/or at least one volatile memory device such as a dynamic random access memory ("DRAM") device, a static random access memory ("SRAM") device, a mobile DRAM device, or the like, for example.

The storage device 1030 may include a solid state drive ("SSD") device, a hard disk drive ("HDD") device, a compact disc read-only memory ("CD-ROM") device, or the like. The I/O device 1040 may include an input device such as a keyboard, a keypad, a mouse device, a touch-pad, a touch-screen, or the like and an output device such as a printer, a speaker, or the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Figure 14:
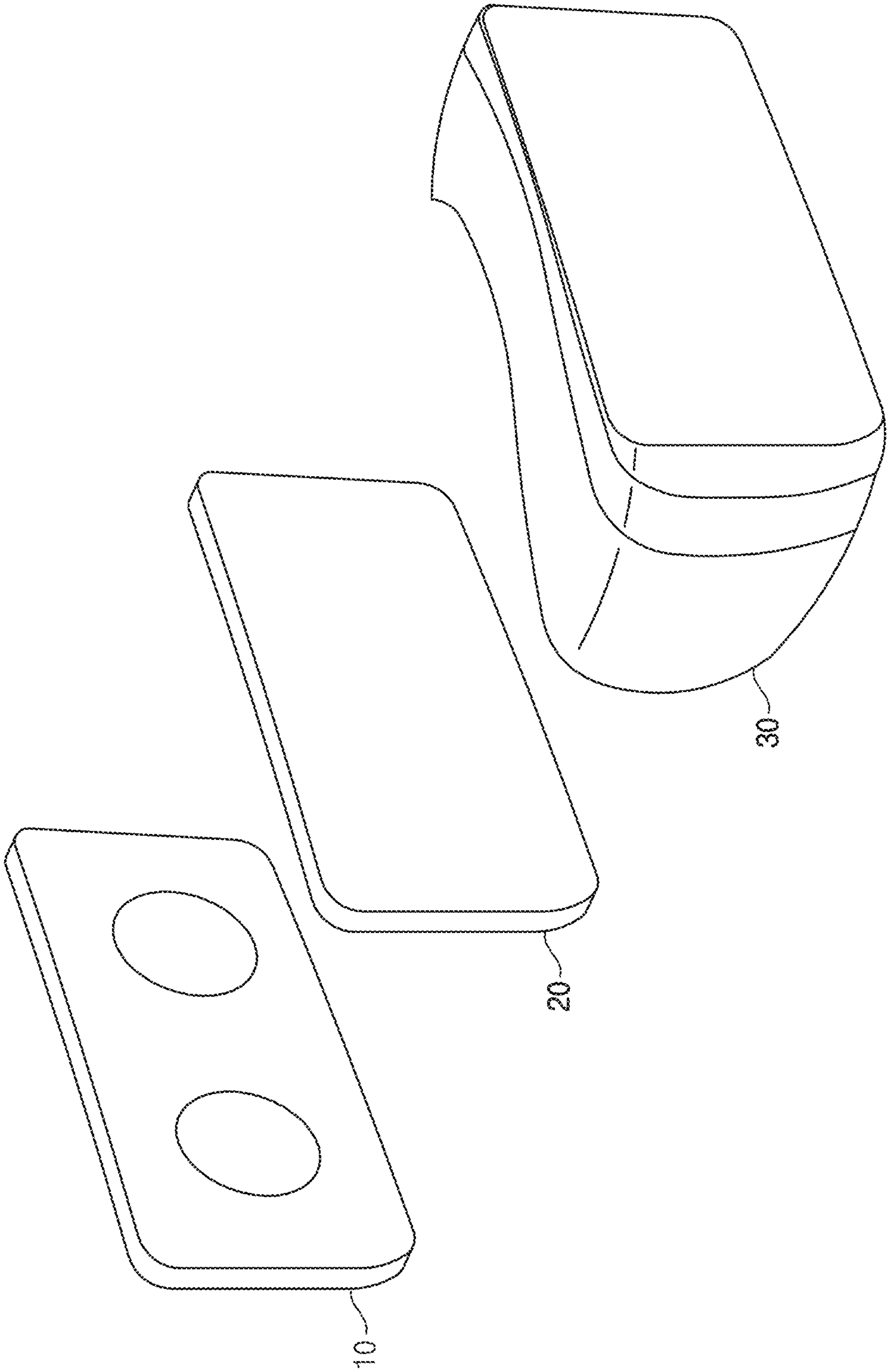
FIG. 14 is a diagram illustrating an embodiment in which the electronic device of FIG. 12 is implemented as a virtual reality display system.

FIG. 14 is a diagram illustrating an embodiment in which the electronic device of FIG. 12 is implemented as a virtual reality display system.

Referring to FIG. 12 and FIG. 14, the virtual reality display system may include a lens unit 10, a display apparatus 20 and a housing 30. The display apparatus 20 is disposed adjacent to the lens unit 10. The housing 30 may receive the lens unit 10 and the display apparatus 20. Although the lens unit 10 and the display apparatus 20 are received in a first side of the housing 30 in FIG. 14, the inventive concept may not be limited thereto. In an alternative embodiment, the lens unit 10 may be received in a first side of the housing 30 and the display apparatus may be received in a second side of the housing 30. When the lens unit 10 and the display apparatus 20 are received in the housing 30 in opposite sides, the housing 30 may have a transmission area to transmit a light.

In an embodiment, the virtual reality display system may be a head disposed (e.g., mounted) display system which is wearable on a head of a user, for example. Although not shown in drawing figures, the virtual reality display system may further include a head band to fix the virtual reality display system on the head of the user.

In an alternative embodiment, the virtual reality display system may have the form of smart glasses implemented in the shape of glasses.

Additionally, the electronic device may be implemented as an augmented reality display system, a mixed reality display system, or an extended reality display system.

The display apparatus in the embodiments may be applied to a display device included in a computer, a notebook, a mobile phone, a smart phone, a smart pad, a portable media player ("PMP"), a personal digital assistance ("PDA"), a motion pictures expert group audio layer III ("MP3") player, or the like.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the illustrative embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A pixel circuit comprising:

a light-emitting element;

a first transistor which applies a first power supply voltage to a second node in response to a voltage of a first node;

a second transistor which applies a voltage of the second node to the first node in response to a control signal;

a third transistor which applies the voltage of the second node to the light-emitting element in response to the control signal; and a first capacitor connected to the first node, wherein the first power supply voltage has a first voltage level, a second voltage level lower than the first voltage level, or a data voltage.

2. The pixel circuit of claim 1, wherein the second transistor is an N-type transistor, and the third transistor is a P-type transistor.

3. The pixel circuit of claim 2, wherein, in a first period, the first power supply voltage has the data voltage, the second transistor is turned on in response to a logic high level of the control signal, and the third transistor is turned off in response to the logic high level of the control signal.

4. The pixel circuit of claim 3, wherein, in a second period following the first period, the first power supply voltage has the first voltage level, the second transistor is turned off in response to a logic low level of the control signal, and the third transistor is turned on in response to the logic low level of the control signal.

5. The pixel circuit of claim 2, further comprising:

a fourth transistor which applies the first power supply voltage to the first transistor in response to an emission signal.

6. The pixel circuit of claim 5, wherein, in a first period, the first power supply voltage has the second voltage level, the emission signal has an inactivation level, the second transistor is turned on in response to a logic high level of the control signal, and the third transistor is turned off in response to the logic high level of the control signal.

7. The pixel circuit of claim 6, wherein, in a second period following the first period, the first power supply voltage has the data voltage, the emission signal has an activation level, and the fourth transistor is turned on in response to the activation level of the emission signal.

8. The pixel circuit of claim 7, wherein, in a third period following the second period, the first power supply voltage has the second voltage level, the emission signal has the inactivation level, and the fourth transistor is turned off in response to the inactivation level of the emission signal.

9. The pixel circuit of claim 8, wherein, in a fourth period following the third period, the first power supply voltage has the first voltage level, the emission signal has an activation level, the fourth transistor is turned on in response to the activation level of the emission signal, the second transistor is turned off in response to a logic low level of the control signal, and the third transistor is turned on in response to the logic low level of the control signal.

10. The pixel circuit of claim 1, further comprising:

a fourth transistor which applies the first power supply voltage to the first transistor in response to an emission signal, wherein the second transistor is a P-type transistor, and the third transistor is an N-type transistor.

11. The pixel circuit of claim 10, wherein, in a first period, the first power supply voltage has the second voltage level, the emission signal has an inactivation level, the second transistor is turned on in response to a logic low level of the control signal, and the third transistor is turned off in response to the logic low level of the control signal.

12. The pixel circuit of claim 11, wherein, in a second period following the first period, the first power supply voltage has the data voltage, the emission signal has an activation level, and the fourth transistor is turned on in response to the activation level of the emission signal.

13. The pixel circuit of claim 12, wherein, in a third period following the second period, the first power supply voltage has the second voltage level, the emission signal has the inactivation level, and the fourth transistor is turned off in response to the inactivation level of the emission signal.

14. The pixel circuit of claim 13, wherein, in a fourth period following the third period, the first power supply voltage has the first voltage level, the emission signal has an activation level, the fourth transistor is turned on in response to the activation level of the emission signal, the second transistor is turned off in response to a logic high level of the control signal, and the third transistor is turned on in response to the logic high level of the control signal.

15. A pixel circuit comprising:

a first transistor including a control electrode connected to a first node, a first electrode connected to a second node, and a second electrode connected to a third node;

a second transistor including a control electrode which receives an emission signal, a first electrode which receives a first power supply voltage, and a second electrode connected to the second node;

a third transistor including a control electrode which receives a control signal, a first electrode connected to the third node, and a second electrode connected to the first node;

a fourth transistor including a control electrode which receives the control signal, a first electrode connected to the third node, and a second electrode connected to a fourth node;

a first capacitor including a first electrode which receives a second power supply voltage and a second electrode connected to the first node; and a light-emitting element including an anode connected to the fourth node and a cathode which receives a third power supply voltage, wherein the first power supply voltage has a first voltage level, a second voltage level lower than the first voltage level or a data voltage.

16. The pixel circuit of claim 15, wherein the third transistor is an N-type transistor, and the fourth transistor is a P-type transistor.

17. The pixel circuit of claim 15, wherein the third transistor is a P-type transistor, and the fourth transistor is an N-type transistor.

18. A display apparatus comprising:

a display panel including:

a pixel circuit, the pixel circuit comprising:

a light-emitting element;

a first transistor which applies a first power supply voltage to a second node in response to a voltage of a first node;

a second transistor which applies the first power supply voltage to the first transistor in response to an emission signal;

a third transistor which applies a voltage of the second node to the first node in response to a control signal;

a fourth transistor which applies the voltage of the second node to the light-emitting element in response to the control signal; and a first capacitor connected to the first node;

a data driver which applies the first power supply voltage to the pixel circuit;

a gate driver which applies the control signal to the pixel circuit;

an emission driver which applies the emission signal to the pixel circuit; and a driving controller which controls the data driver, the gate driver and the emission driver, wherein the first power supply voltage has a first voltage level, a second voltage level lower than the first voltage level or a data voltage.

19. The display apparatus of claim 18, wherein the third transistor is an N-type transistor, and the fourth transistor is a P-type transistor.

20. The display apparatus of claim 18, wherein the pixel circuit is formed on a silicon-based substrate.

* * * * *